US010909184B2

(12) United States Patent
Rajagopalan et al.

(10) Patent No.: US 10,909,184 B2
(45) Date of Patent: Feb. 2, 2021

(54) MULTIPLICATION OF DATABASE OBJECTS

(71) Applicant: SAP SE, Walldorf (DE)

(72) Inventors: Nithya Rajagopalan, Bangalore (IN); Jeremiah Reeves, Ripon, CA (US); Gurudayal Khosla, Bangalore (IN)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 16/127,748

(22) Filed: Sep. 11, 2018

(65) Prior Publication Data

US 2020/0082028 A1 Mar. 12, 2020

(51) Int. Cl.
*G06F 16/9038* (2019.01)
*G06F 16/11* (2019.01)
*G06F 16/901* (2019.01)

(52) U.S. Cl.
CPC ........ *G06F 16/9038* (2019.01); *G06F 16/122* (2019.01); *G06F 16/9024* (2019.01)

(58) Field of Classification Search
USPC ........................................................ 707/736
See application file for complete search history.

(56) References Cited

U.S. PATENT DOCUMENTS

| | | | | |
|---|---|---|---|---|
| 7,395,194 B2* | 7/2008 | O'Rourke | ............. | G05B 15/02 |
| | | | | 702/81 |
| 7,574,450 B2* | 8/2009 | Plouffe, Jr. | ........... | G06F 9/4493 |
| 7,620,935 B2* | 11/2009 | Baisley | ................ | G06F 40/205 |
| | | | | 717/108 |
| 7,996,636 B1* | 8/2011 | Prakash | ................ | G06F 3/0619 |
| | | | | 711/162 |
| 8,285,681 B2* | 10/2012 | Prahlad | .................. | G06Q 30/02 |
| | | | | 707/640 |
| 8,942,733 B2* | 1/2015 | Johnson | .................. | H04L 67/10 |
| | | | | 455/456.3 |
| 9,348,880 B1* | 5/2016 | Kramer | ............. | G06F 16/24575 |
| 9,646,024 B2* | 5/2017 | Srivas | ................... | H04L 65/102 |
| 9,881,066 B1* | 1/2018 | Yousaf | ................ | G06F 16/248 |
| 9,886,520 B2* | 2/2018 | Mion | .................. | G06F 16/9024 |
| 10,002,164 B2* | 6/2018 | Jarvis | ............... | G06F 16/24575 |
| 2014/0281217 A1* | 9/2014 | Beam | ...................... | G06F 3/067 |
| | | | | 711/114 |
| 2017/0177895 A1* | 6/2017 | McHale | ................ | G06F 16/122 |
| 2017/0329788 A1* | 11/2017 | Grasselt | ............... | G06F 40/247 |

* cited by examiner

*Primary Examiner* — Cam Linh T Nguyen
(74) *Attorney, Agent, or Firm* — Mintz Levin Cohn Ferris Glovsky and Popeo, P.C.

(57) ABSTRACT

A method for multiplying an object in a database may include receiving, from a client, an indication that an object is associated with a first variable attribute having a first variation and a second variation. A bucket may be created in response to the indication. The bucket may include the object, a first sub-object having a first reference to the first variation of the first variable attribute, and a second sub-object having a second reference to the second variation of the first variable attribute. The bucket may be created instead of a first object having the first variation of the first variable attribute and a second object having the second variation of the first variable attribute. The bucket stored in the database may be accessed in response to a query from the client accessing the object. Related systems and articles of manufacture including computer program products are also provided.

18 Claims, 9 Drawing Sheets

MULTIPLICATION OF DATABASE OBJECTS

TECHNICAL FIELD

The subject matter described herein relates generally to database processing and more specifically to the multiplication of database objects.

BACKGROUND

Data stored in a database may be organized in accordance with a schema. For example, the schema of a database may define the structure of the database including, for example, tables, relationships, views, indices, and/or the like. The schema may include objects that represent different data elements. For example, in a procurement and inventory system, an object may be a line item corresponding to an article. As such, each object may include one or more attributes associated with a corresponding article. Furthermore, the relationships between two or more objects may reflect the relationships between the corresponding articles.

SUMMARY

Systems, methods, and articles of manufacture, including computer program products, are provided for multiplying objects in a database. In one aspect, there is provided a system. The system may include at least one data processor and at least one memory. The at least one memory may store instructions that result in operations when executed by the at least one data processor. The operations may include receiving, from a client, an indication that an object is associated with a first variable attribute having a first variation and a second variation. The operations may further include responding to the indication by at least creating, at a database, a bucket that includes the object, a first sub-object, and a second sub-object. The first sub-object may have a first reference to the first variation of the first variable attribute. The second sub-object may have a second reference to the second variation of the first variable attribute. The bucket stored in the database may be accessed in response to a query from the client accessing the object.

In some variations, one or more features disclosed herein including the following features can optionally be included in any feasible combination. The bucket may be created at the database instead of a first object having the first variation of the first variable attribute and a second object having the second variation of the first variable attribute.

In some variations, the object may include a multiplier term. The multiplier term may be an array and/or a matrix storing the first variation of the first variable attribute and the second variation of the first variable attribute. The first reference and the second reference may be pointers to first variation of the first variable attribute and the second variation of the first variable attribute stored in the multiplier term.

In some variations, another indication that the object is associated with a second variable attribute having a third variation and a fourth variation may be received from the client. The bucket may be created to include a third sub-object and a fourth sub-object in response to the other indication. The first sub-object may include the first reference to the first variation of the first variable attribute and a third reference to the third variation of the second variable attribute. The second sub-object may include the second reference to the second variation of the first variable attribute and a fourth reference to the third variation of the second variable attribute. The third sub-object may include a fifth reference to the first variation of the first variable attribute and a sixth reference to the fourth variation of the second variable attribute. The fourth sub-object may include a seventh reference to the second variation of the first variable attribute and an eighth reference to the fourth variation of the second variable attribute In some variations, the first sub-object and the second sub-object may each include a reference to the object.

In some variations, the method may further include responding to the query by at least generating, based at least on the bucket, a user interface for displaying the object. The user interface may display the first sub-object and the second sub-object as a single line item. The user interface may display a first line item corresponding to the first sub-object and a second line item corresponding to the second sub-object.

In some variations, the object may further include one or more common attributes.

In another aspect, there is provided a method. The method may include receiving, from a client, an indication that an object is associated with a first variable attribute having a first variation and a second variation. The operations may further include responding to the indication by at least creating, at a database, a bucket that includes the object, a first sub-object, and a second sub-object. The first sub-object may have a first reference to the first variation of the first variable attribute. The second sub-object may have a second reference to the second variation of the first variable attribute. The bucket stored in the database may be accessed in response to a query from the client accessing the object.

In some variations, one or more features disclosed herein including the following features can optionally be included in any feasible combination. The bucket may be created at the database instead of a first object having the first variation of the first variable attribute and a second object having the second variation of the first variable attribute.

In some variations, the object may include a multiplier term. The multiplier term may be an array and/or a matrix storing the first variation of the first variable attribute and the second variation of the first variable attribute. The first reference and the second reference may be pointers to first variation of the first variable attribute and the second variation of the first variable attribute stored in the multiplier term.

In some variations, another indication that the object is associated with a second variable attribute having a third variation and a fourth variation may be received from the client. The bucket may be created to include a third sub-object and a fourth sub-object in response to the other indication. The first sub-object may include the first reference to the first variation of the first variable attribute and a third reference to the third variation of the second variable attribute. The second sub-object may include the second reference to the second variation of the first variable attribute and a fourth reference to the third variation of the second variable attribute. The third sub-object may include a fifth reference to the first variation of the first variable attribute and a sixth reference to the fourth variation of the second variable attribute. The fourth sub-object may include a seventh reference to the second variation of the first variable attribute and an eighth reference to the fourth variation of the second variable attribute In some variations, the first sub-object and the second sub-object may each include a reference to the object.

In some variations, a user interface for displaying the object may be generated based at least on the bucket, in response to the query. The user interface may display the first sub-object and the second sub-object as a single line item. The user interface may display a first line item corresponding to the first sub-object and a second line item corresponding to the second sub-object.

In another aspect, there is provided a computer program product that includes a non-transitory computer readable medium. The non-transitory computer readable medium may store instructions that result in operations when executed by at least one data processor. The operations may include receiving, from a client, an indication that an object is associated with a first variable attribute having a first variation and a second variation. The operations may further include responding to the indication by at least creating, at a database, a bucket that includes the object, a first sub-object, and a second sub-object. The first sub-object may have a first reference to the first variation of the first variable attribute. The second sub-object may have a second reference to the second variation of the first variable attribute. The bucket stored in the database may be accessed in response to a query from the client accessing the object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the multiplication of database objects, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Each object in a database may include one or more attributes. For example, an object in a procurement and inventory system may be a line item corresponding to an article. Accordingly, the object may include at least an attribute for a supplier providing the article. In a conventional database, multiple objects may be generated for a single article in order to account for variations in a small subset of attributes associated with the article. For instance, a different object may be generated for each supplier of the same article even when other attributes for the article remain the same. Multiplying objects in this manner may result in a proliferation of nearly identical objects in the database. As such, a query to the database may return a multitude of objects for substantially the same article, with the objects differing only with respect to a few attributes such as, for example, the supplier providing the article.

In some example embodiments, to avoid the proliferation of nearly identical objects in a database, a bucket may be created in order to associate an object with a multiplier term that includes variations for a subset of the attributes associated with the object. The bucket may include the object and one or more sub-objects. Each of the one or more sub-objects may be mapped to the object, for example by at least containing a reference to the object. Furthermore, each sub-objects may hold a reference to one variation of an attribute associated with the object. In instances where the object is associated with multiple variable attributes, the bucket may include a sub-object for every combination of variations in the attributes associated with the object.

For example, the bucket may associate an object corresponding to an article with a multiplier term that includes variations for a supplier of the article. As such, each sub-objects included in the bucket may be mapped to the object corresponding to the article. Moreover, each sub-objects included in the bucket may hold a reference to a supplier providing the article. Accordingly, the bucket may include a first sub-objects corresponding to the article being provided by a first supplier and a second sub-objects corresponding to the article being provided by a second supplier.

Figure 1:
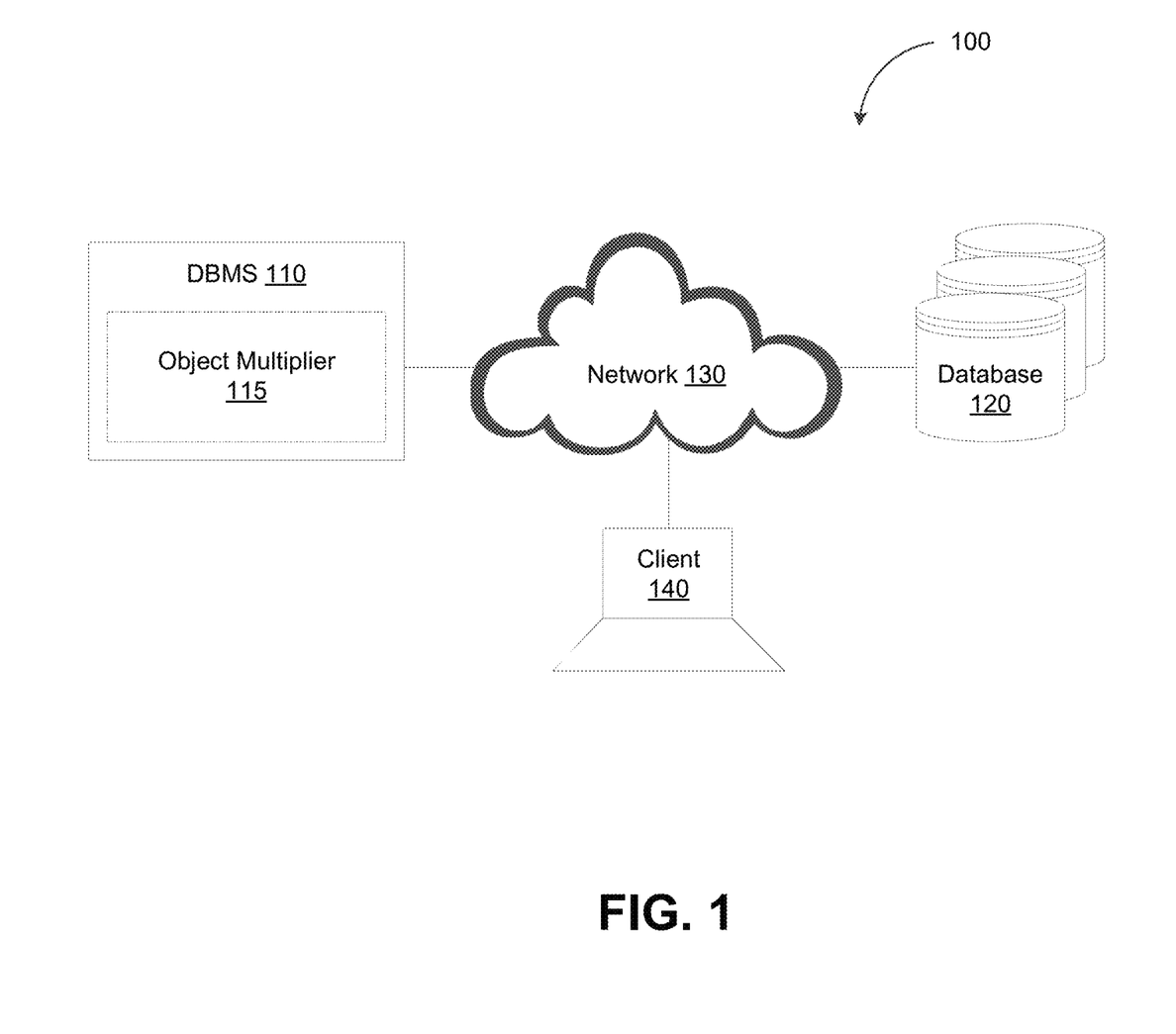
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may include a database management system 110 and a database 120. The database 120 may be any type of database including, for example, an in-memory database, a relational database, a non-SQL (NoSQL) database, and/or the like. Meanwhile, the database management system 110 may support a variety of operations (e.g., structured query language (SQL) statements) for accessing the data stored in the database 120. As shown in FIG. 1, a client 140 may query the database 120 by at least sending, to the database management system 110, one or more requests to perform the operations (e.g., SQL statements) for accessing the data stored in the database 120.

Referring again to FIG. 1, the database management system 110, the database 120, and/or the client 140 may be communicatively coupled via a network 130. It should be appreciated that the network 130 may be any wired and/or wireless network including, for example, a local area network (LAN), a wide area network (WAN), a virtual local area network (VLAN), a public land mobile network (PLMN), the Internet, and/or the like. The client 140 may be any processor based device including, for example, a smartphone, a tablet computer, a laptop computer, a workstation, and/or the like.

The database 120 may store data in accordance with a schema, which may define the structure of the database 120 including, for example, tables, relationships, views, indices, and/or the like. As noted, the schema of the database 120 may include one or more objects. For instance, the database 120 may implement a procurement and inventory system. Accordingly, the objects in the database 120 may correspond to different articles such as, for example, different types of grocery items (e.g., baked goods, produce, dairy products, and/or the like). However, it should be appreciated that the database 120 may also be schema-less and store data in the form of one or more key-value pairs.

As shown in FIG. 1, the database management system 110 may include an object multiplication 115. In some example embodiments, an object stored in the database 120 may be associated with a set of attributes. In order to account for variations in a subset of the attributes associated with the object without generating multiple nearly identical objects that differ only with respect to the subset of attributes, the object multiplication 115 may create a bucket associating the object with a multiplier term. The multiplier term may include, for example, an array and/or a matrix storing variations in the subset of attributes. Meanwhile, each sub-objects in the bucket may be mapped to the object as well as a reference to one variation of an attribute associated with the object. As used herein, a reference may be a pointer holding, for example, a memory address of a variation of an attribute stored in the multiplier term.

For example, an object corresponding to an article may have one or more variable attributes including, for example, the supplier providing the article. Instead of generating a different object for each supplier providing the article, the object multiplication 115 may create a bucket associating an object corresponding to the article to a multiplier term that includes variations in the supplier providing the article. The object may include one or more common attributes of the article, which may remain static. Meanwhile, the bucket may include the object. Furthermore, the bucket may include different sub-objects, each of which corresponding to a variation of the one or more variable attributes associated with the article such as, for example, the supplier providing the article. For instance, the bucket may include a first sub-objects corresponding to the article being provided by a first supplier and a second sub-objects corresponding to the article being provided by a second supplier. The first sub-objects may include a reference to the object corresponding to the article as well as a reference to the first supplier in the multiplier term. Alternatively and/or additionally, the second sub-objects may also include reference to the object corresponding to the article and a reference to the second supplier in the multiplier term.

In some example embodiments, the database 120 may store the bucket instead of a different object for each supplier providing the article. Moreover, when the client 140 queries the database 120 regarding the article, the database management system 110 may respond to the query by accessing the bucket instead of a multitude of objects that differ only with respect to the supplier providing the article. For example, the bucket may include the first sub-objects corresponding to the article being provided by the first supplier and the second sub-objects corresponding to the article being provided by the second supplier. The first sub-objects and the second sub-objects may be mapped to a single object corresponding to the article. Moreover, the first sub-objects may include a reference to the first supplier in the multiplier term while the second sub-objects may include a reference to the second supplier in the multiplier term. The database management system 110 may respond to the query at least by accessing the bucket including, for example, the first sub-objects and/or the second sub-objects, instead of a first object corresponding to the article being provided by the first supplier and the second object corresponding to the article being provided by the second supplier.

Figure 2:
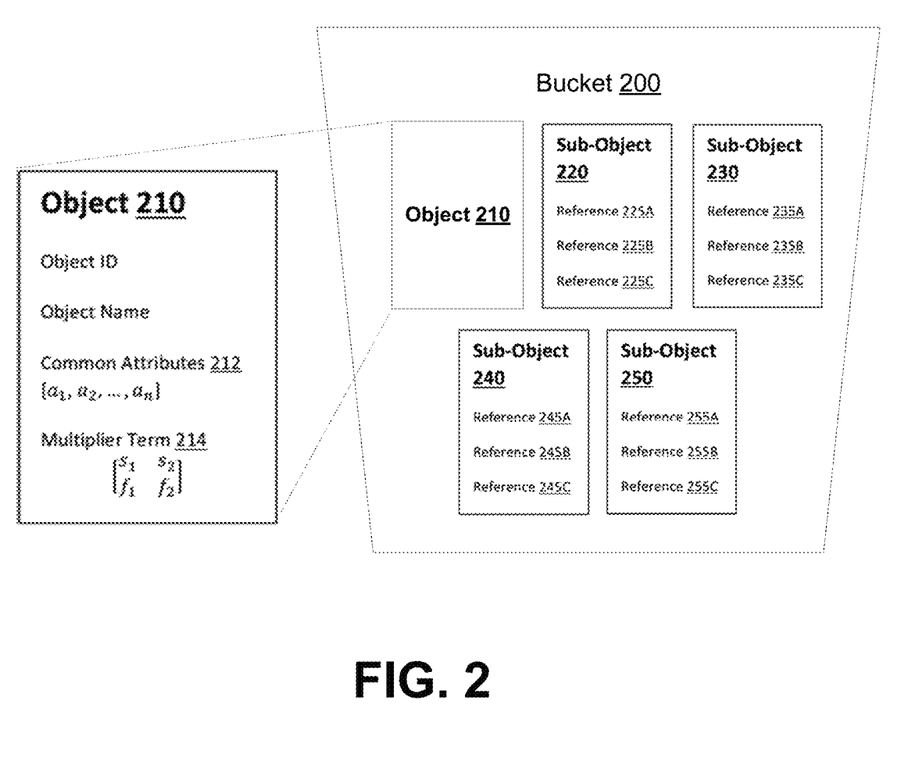
FIG. 2 depicts a block diagram illustrating an example of a bucket, in accordance with some example embodiments.

To further illustrate, FIG. 2 depicts a block diagram illustrating an example of a bucket 200, in accordance with some example embodiments. In some example embodiments, the object multiplier 115 may generate the bucket 200 in order to account for variations in a subset of attributes associated with an object 210. The object 210 may be a line item corresponding to an article such as, for example, yogurt. As shown in FIG. 2, the object 210 may include one or more common attributes 212. The one or more common attributes 212 may include an n quantity of attributes a (e.g., $a_1, a_2, \ldots a_n$), which may remain static. Alternatively and/or additionally, the object 210 may include a multiplier term 214. The multiplier term 214 may include an array and/or a matrix storing one or more variable attributes of the object 210. For example, the multiplier term 214 may include an array and/or a matrix that hold the different suppliers for the yogurt including, for example, a first supplier $s_1$, a second supplier $s_2$, and/or the like. The array and/or the matrix may further hold different fat content available for the yogurt including, for example, a first fat content $f_1$, a second fat content $f_2$, and/or the like.

Referring again to FIG. 2, in order to account for variations in the supplier providing the yogurt and the fat content of the yogurt corresponding to the object 210, the object multiplier 115 may create the bucket 200. In some example embodiments, the bucket 200 may include the object 210. Moreover, the bucket 200 may include one or more sub-objects, each of which being mapped to the object 210 and a variation of an attribute included in the multiplier term 214. That is, the bucket 200 may include a sub-object for each combination of the variations in the supplier providing the yogurt (e.g., the first supplier $s_1$ and the second supplier $s_2$) and the fat content of the yogurt (e.g., the first fat content $f_1$ and the second fat content $f_2$).

For example, the bucket 200 may include a first sub-object 220, a second sub-object 230, a third sub-object 240, a fourth sub-object 250, and/or the like. The first sub-object 220 may include a first reference 225A to the object 210 and a second reference 225B to the first supplier $s_1$ included in the multiplier term 214, and a third reference 225C to the first fat content $f_1$ included in the multiplier term 214. As such, the first sub-object 220 may correspond to a yogurt provided by the first supplier $s_1$ and having the first fat content $f_1$. Alternatively and/or additionally, the second sub-object 230 may correspond to a yogurt having the first fat content $f_1$ but is provided by the second supplier $s_2$. Accordingly, the second sub-object 230 may include a fourth reference 235A to the object 210, a fifth reference 235B to the second supplier $s_2$ included in the multiplier term 214, and a sixth reference to the first fat content $f_1$. included in the multiplier term 214.

The third sub-object 240 may correspond to a yogurt provided by the second supplier $s_2$ and having the first fat content $f_1$ whereas the fourth sub-object 250 may correspond to a yogurt provided by the first supplier $s_1$ and having the second fat content $f_2$. Accordingly, the third sub-object 240 may include a seventh reference 245A to the object 210, an eighth reference 245B to the second supplier $s_2$ included in the multiplier term 214, and a ninth reference 245C to the first fat content $f_1$ included in the multiplier term 214. Meanwhile, the fourth sub-object 250 may include a tenth reference 255A to the object 210, an eleventh reference 255B to the first supplier $s_1$ included in the multiplier term 214, and a twelfth reference 255C to the second fat content $f_2$ included in the multiplier term 214.

In some example embodiments, the bucket 200 may be stored in the database 120 instead of multiple nearly identical objects for yogurts that differ only with respect to the fat content of the yogurt and/or the supplier providing the yogurt. As such, by generating the bucket 200, the object multiplier 115 may avoid a proliferation of nearly identical objects in the database 120. Furthermore, when the client 140 queries for the object 210, the database management system 110 may respond to the query by providing a single line item that includes yogurts having different fat content and provided by different suppliers instead of multiple nearly identical line items. Alternatively and/or additionally, the database management system 110 may respond to the query by providing multiple line items, each of which corresponding to a yogurt having a different fat content and/or provided by a different supplier.

Figure 3A:
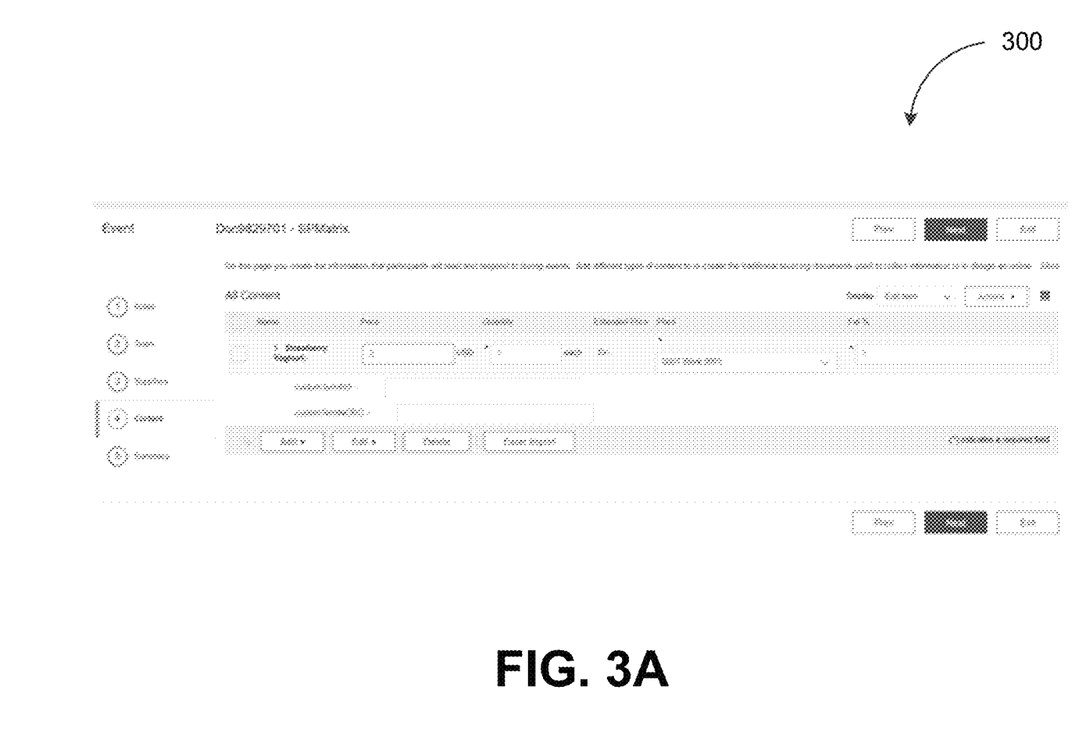
FIG. 3A depicts an example of a user interface for creating an object in a database, in accordance with some example embodiments.

FIG. 3A-E depicts examples of user interfaces for interacting with the database management system 110 including, for example, the multiplication engine 115, to create and/or access the bucket 200. For example, FIG. 3A depicts a user interface 300 for creating the object 210 in the database 120, in accordance with some example embodiments. In some example embodiments, the database management system 110 may generate the user interface 300 for display at the client 140. As shown in FIG. 3A, the client 140 may create the object 210 by at least specifying one or more attributes associated with the object 210, which may include, for example, the common attributes 212 and the variable attributes included in the multiplier term 214.

Figure 3B:
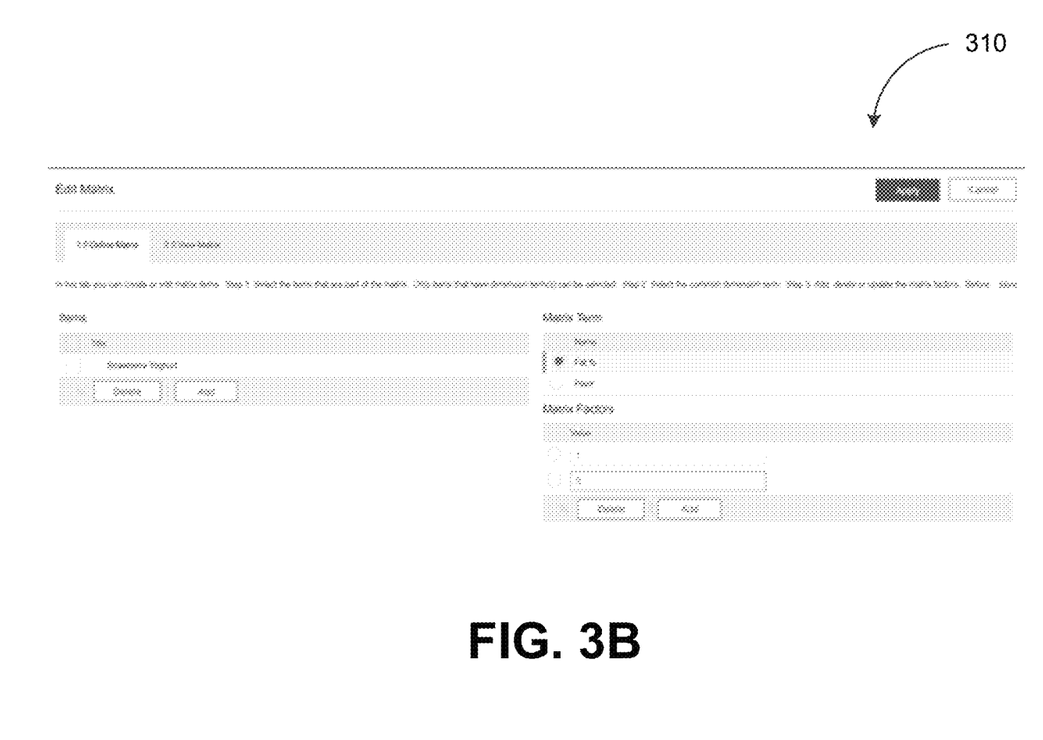
FIG. 3B depicts an example of a user interface for creating a multiplier term, in accordance with some example embodiments.
Figure 3C:
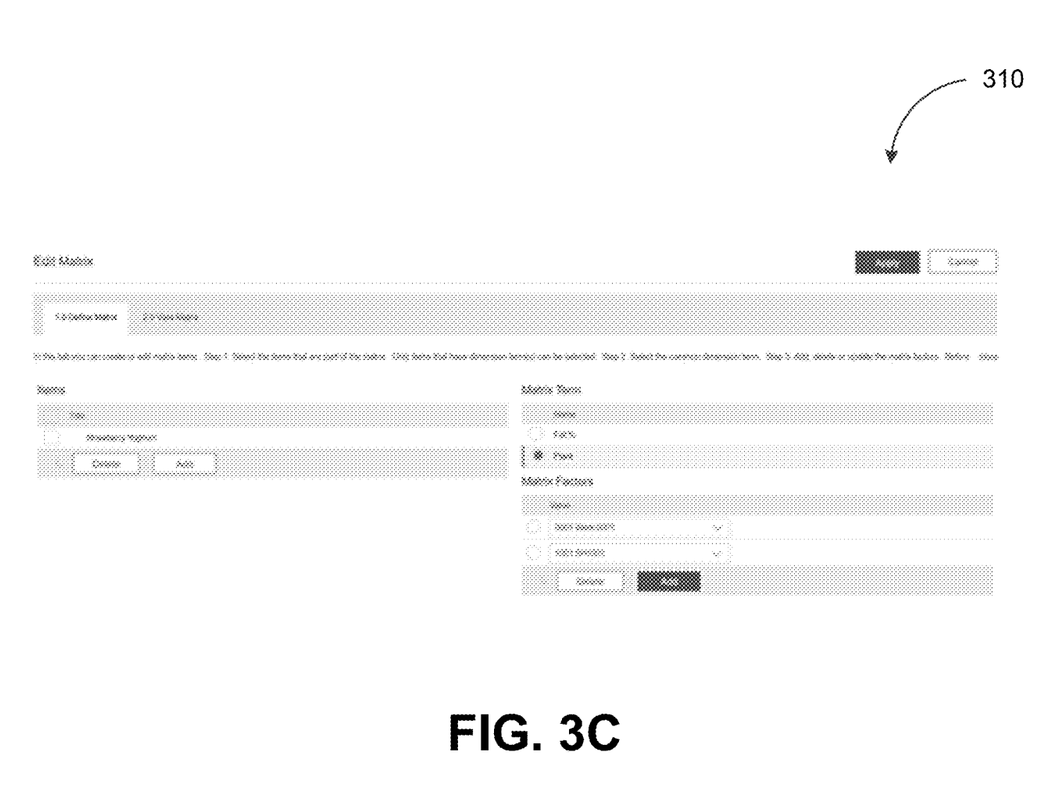
FIG. 3C depicts an example of a user interface for creating a multiplier term, in accordance with some example embodiments.

FIGS. 3B-C depicts a user interface 310 for creating the multiplier term 114, in accordance with some example embodiments. The database management system 110 may generate the user interface 310 for display at the client 140 such that the client 140 is able to create the multiplier term 114. In some example embodiments, the client 140 may create the multiplier term 114 by at least specifying one or more variable attributes of the object 210. For instance, as shown in FIG. 3B, the client 140 may specify, at least by providing one or more inputs via the user interface 310, fat content as a variable attribute. Furthermore, the client 140 may specify, by inputs provided via the user interface 310, the first fat content $f_1$ and the second fat content $f_2$ as variations in the fat content of the yogurt. In doing so, the client 140 may add, to the multiplier term 114, the variations in the fat content of the yogurt including, for example, the first fat content $f_1$ and the second fat content $f_2$. Alternatively and/or additionally, FIG. 3C shows that the client 140 may also specify, by inputs provided via the user interface 310, supplier as a variable attribute. The client 140 may further specify, by inputs provided via the user interface 310, the first supplier $s_1$ and the second supplier $s_2$ as variations in the supplier providing the yogurt. In doing so, the client 140 may add, to the multiplier term 114, the variations in the supplier providing the yogurt including, for example, the first supplier $s_1$ and the second supplier $s_2$.

Figure 3D:
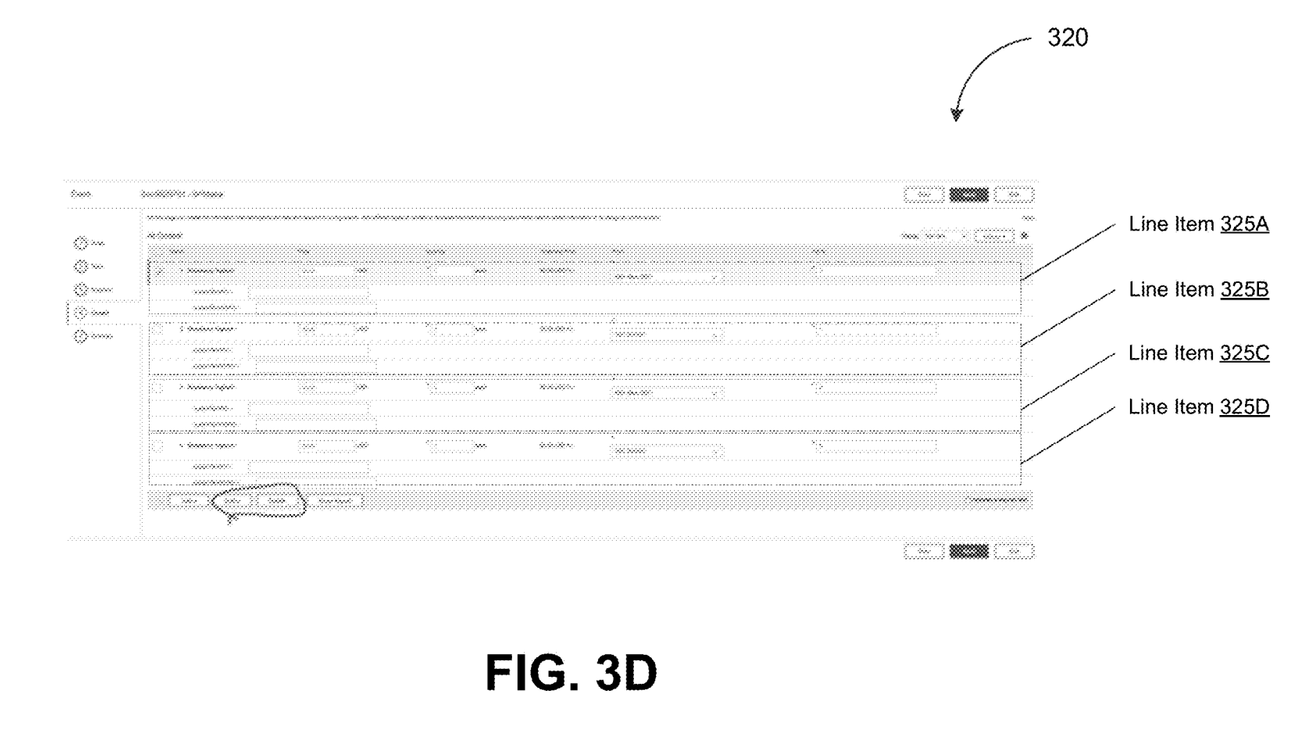
FIG. 3D depicts an example of a user interface displaying an object, in accordance with some example embodiments.

FIG. 3D depicts a user interface 320 displaying the object 210, in accordance with some example embodiments. In some example embodiments, the database management system 110 may generate the user interface 320 in response to a query from the client 140 to access the object 200. The database management system 110 may generate, based at least on the bucket 200, the user interface 320 for displaying the object 210 including, for example, yogurts having different fat content and/or provided by different suppliers. As shown in FIG. 3D, the object 210 may be displayed as multiple line items, each of which corresponding to a yogurt provided by a different supplier and/or having a different fat content. For example, the user interface 320 may display a first line item 325A corresponding to the yogurt provided by the first supplier $s_1$ and having the first fat content $f_1$, a second line item 325B corresponding to the yogurt provided by the second supplier $s_2$ and having the first fat content $f_1$, a third line item 325C corresponding to the yogurt provided by the first supplier $s_1$ and having the second fat content $f_2$, and a fourth line item 325D corresponding to the yogurt provided by the second supplier $s_2$ and having the second fat content $f_2$. Each of the first line item 325A, the second line item 325B, the third line item 325C, and/or the fourth line item 325D may show one or more attributes associated with yogurts that are provided by different suppliers and/or have different fat content. For instance, FIG. 3D shows the price for yogurts that are provided by different suppliers and/or have different fat content.

Figure 3E:
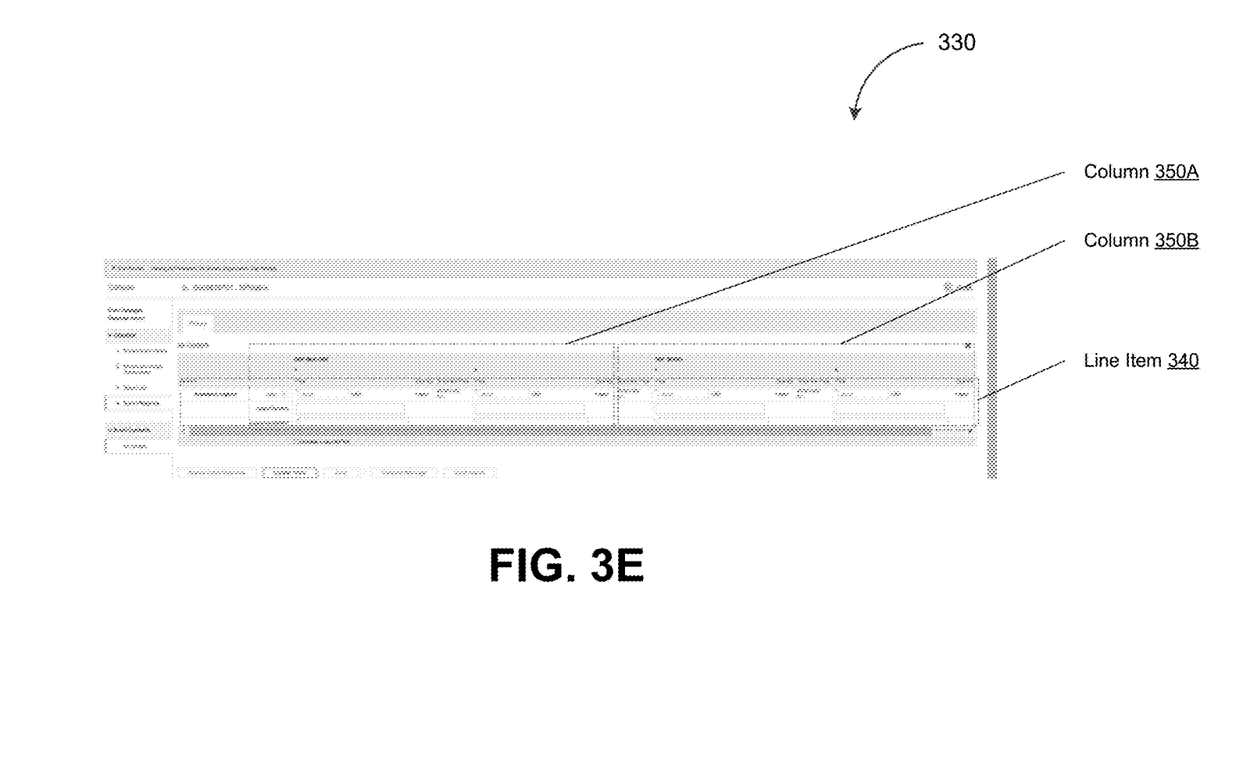
FIG. 3E depicts another example of a user interface for displaying an object, in accordance with some example embodiments.

FIG. 3E depicts another user interface 330 displaying the object 210, in accordance with some example embodiments. Instead of and/or in addition to displaying the object 210 as multiple line items that each correspond to a yogurt provided by a different supplier and/or having a different fat content, FIG. 3E shows that the object 210 may also be displayed as a single line item 340. Yogurts having different fat content and/or are provided by different suppliers may be organized based on the variable attributes. For instance, as shown in FIG. 3E, the single line item 340 may include a first column 350A for yogurts that are provided by the first supplier $s_1$ and a second column 350B for yogurts that are provided by the second supplier $s_2$. Each of the first column 350A and the second column 350B may further include yogurts having different fat content. For example, the first column 350A may show the prices of yogurts provided by the first supplier $s_1$ and having the first fat content $f_1$ as well as the second fat content $f_2$. The second column 350B may show the prices of yogurts provided by the second supplier $s_2$ and having the first content $f_1$ as well as the second fat content $f_2$.

Figure 4:
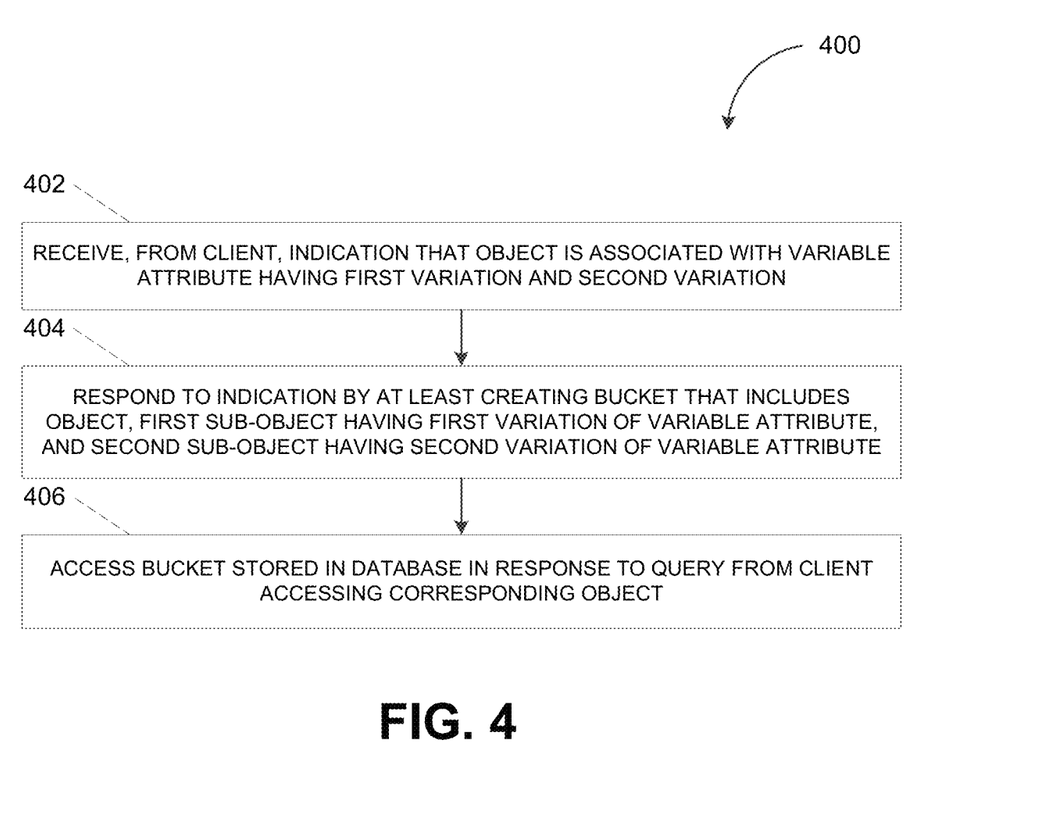
FIG. 4 depicts a flowchart illustrating a process for multiplying an object in a database, in accordance with some example embodiments.

FIG. 4 depicts a flowchart illustrating a process 400 for multiplying an object in a database, in accordance with some example embodiments. Referring to FIGS. 1-2, 3A-E, and 4, the process 400 may be performed by the database management system 110, for example, the object multiplier 115. The database management system 110 may perform the process 400 in order to account for variations in a subset of attributes associated with an object stored in the database 110 such as, for example, the object 210.

At 402, the database management system 110 may receive, from the client 140, an indication that an object is associated with a variable attribute having a first variation and a second variation. In some example embodiments, the client 140 may indicate that the fat content and/or the supplier of a yogurt corresponding to the object 210 may vary. For example, the client 140 may indicate, for example, via the user interface 310, that the yogurt corresponding to the object 210 may be provided by multiple suppliers including, for example, the first supplier $s_1$ the second supplier $s_2$, and/or the like. Alternatively and/or additionally, client 140 may indicate, for example, via the user interface 310, that the yogurt corresponding to the object 210 may have different fat contents including, for example, the first fat content $f_1$, the second fat content $f_2$, and/or the like.

At 404, the database management system 110 may respond to the indication by at least creating a bucket that includes the object, a first sub-object having the first variation of the variable attribute, and a second sub-object having the second variation of the variable attribute. In some example embodiments, the database management system 110 may generate the bucket 200 in order to account for variations in the fat content and/or the supplier of the yogurt corresponding to the object 210. The bucket 200 may include the object 210 as well as one or more sub-objects including, for example, the first sub-object 220, the second sub-object 230, the third sub-object 240, the fourth sub-object 250, and/or the like. Each of the sub-objects may be mapped to the object 210 as well as a variation in the fat content and supplier of the corresponding yogurt.

For instance, the bucket 200 may include a sub-object for each combination of the variations in the supplier providing the yogurt (e.g., the first supplier $s_1$ and the second supplier $s_2$) and the fat content of the yogurt (e.g., the first fat content $f_1$ and the second fat content $f_2$). As shown in FIG. 2, the bucket 200 may include the first sub-object 220 corresponding to the yogurt provided by the first supplier $s_1$ and having the first fat content $f_1$, the second sub-object 230 corresponding to the yogurt provided by the second supplier $s_2$ and having the first fat content $f_1$, the third sub-object 240 corresponding to the yogurt provided by the second supplier $s_2$ and having the first fat content $f_1$, and/or the fourth sub-object 250 may correspond to a yogurt provided by the first supplier $s_1$ and having the second fat content $f_2$.

At 406, the database management system 110 may access the bucket stored in a database in response to a query from the client 140 accessing the corresponding object. In some example embodiments, the bucket 200 may be stored at the database 120 instead of multiple nearly identical objects for each yogurt that differ only with respect to a subset of the attributes of the object 210 including, for example, the supplier providing the yogurt and/or the fat content of the yogurt. As such, when the client 140 queries the database 120 to access the object 210, the database management system 110 may respond to the query by at least accessing the bucket 200. Furthermore, the database management system 110 may display the object 210 as a single line item and/or as multiple line items.

For example, as shown in FIG. 3D, the database management system 110 may generate the user interface 320 for displaying the object 210 as multiple line items including, for example, the first line item 325A, the second line item 325B, the third line item 325C, and/or the fourth line item 325D. Each line item shown in the user interface 320 may correspond to a yogurt provided by a different supplier and/or having a different fat content. For instance, the first line item 325A may correspond to the yogurt provided by the first supplier $s_1$ and having the first fat content $f_1$, the second line item 325B may correspond to the yogurt provided by the second supplier $s_2$ and having the first fat content $f_1$, the third line item 325C may correspond to the yogurt provided by the first supplier $s_1$ and having the second fat content $f_2$, and the fourth line item 325D may correspond to the yogurt provided by the second supplier $s_2$ and having the second fat content $f_2$. As noted, each of the first line item 325A, the second line item 325B, the third line item 325C, and/or the fourth line item 325D may show one or more attributes associated with yogurts that are provided by different suppliers and/or have different fat content such as, for example, the price of yogurts provided by different suppliers and/or have different fat content.

Alternatively and/or additionally, as shown in FIG. 3E, the database management system 110 may generate the user interface 330 for displaying the object 210 as the single line item 340. The single line item 340 may include the first column 350A for yogurts that are provided by the first supplier $s_1$ and the second column 350B for yogurts that are provided by the second supplier $s_2$. Each of the first column 350A and the second column 350B may further include yogurts having different fat content. For example, the first column 350A may show the prices of yogurts provided by the first supplier $s_1$ and having the first fat content $f_1$ as well as the second fat content $f_2$. The second column 350B may show the prices of yogurts provided by the second supplier $s_2$ and having the first content $f_1$ as well as the second fat content $f_2$.

Figure 5:
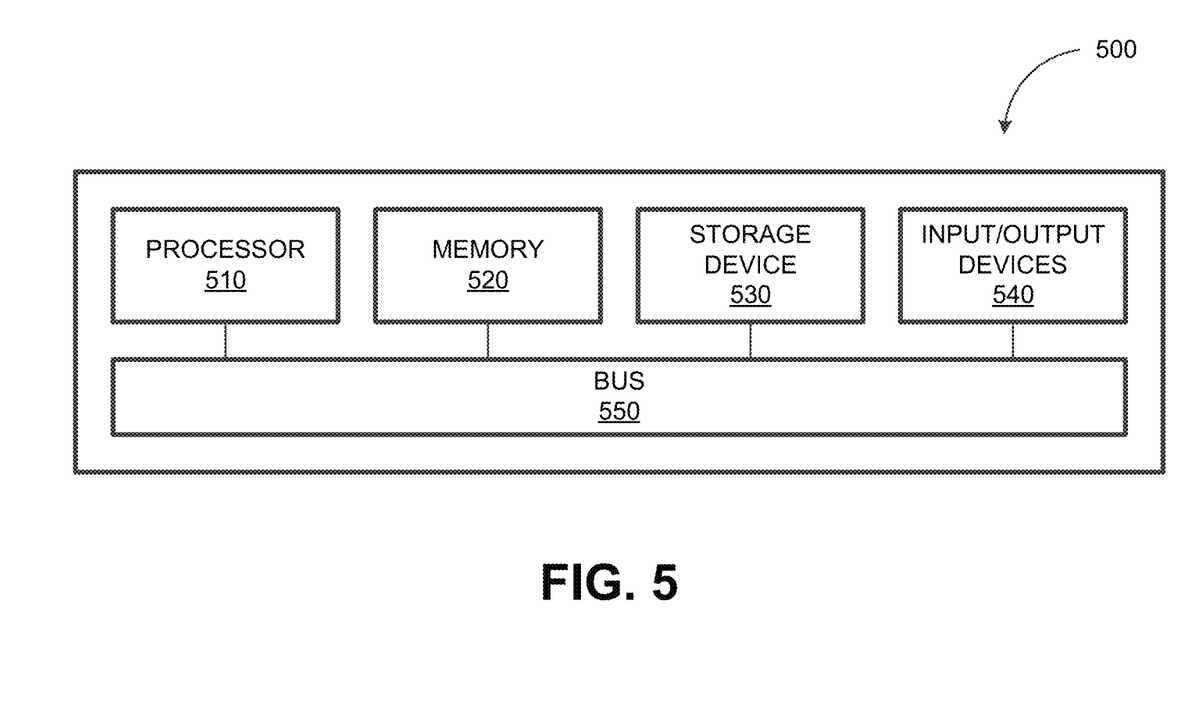
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and at least one memory storing instructions which, when executed by the at least one data processor, cause operations comprising:
  receiving, from a client, an indication that an object is associated with a first variable attribute having a first variation and a second variation, the object being further associated with a multiplier and one or more common attributes, the multiplier comprising the first variation of the first variable attribute and the second variation of the first variable attribute;
  responding to the indication by at least creating, at a database, a bucket that includes the object, a first sub-object, and a second sub-object, the first sub-object having a first reference to the first variation of the first variable attribute, and the second sub-object having a second reference to the second variation of the first variable attribute, the bucket being created at the database instead of creating a first object having the first variation of the first variable attribute and a second object having the second variation of the second variable attribute; and
  in response to receiving, from the client, a query accessing the object, accessing the bucket stored in the database.

2. The system of claim 1, wherein the multiplier comprises an array and/or a matrix storing the first variation of the first variable attribute and the second variation of the first variable attribute, and wherein the first reference and the second reference comprise pointers to first variation of the first variable attribute and the second variation of the first variable attribute stored in the multiplier.

3. The system of claim 1, further comprising:
  receiving, from the client, another indication that the object is associated with a second variable attribute having a third variation and a fourth variation; and
  responding to the other indication by at least creating the bucket to include a sub-object for each combination of the first variable attribute and the second variable attribute.

4. The system of claim 3, wherein the bucket is created to include a third sub-object and a fourth sub-object, wherein the first sub-object includes the first reference to the first variation of the first variable attribute and a third reference to the third variation of the second variable attribute, wherein the second sub-object includes the second reference to the second variation of the first variable attribute and a fourth reference to the third variation of the second variable attribute, wherein the third sub-object includes a fifth reference to the first variation of the first variable attribute and a sixth reference to the fourth variation of the second variable attribute, and wherein the fourth sub-object includes a seventh reference to the second variation of the first variable attribute and an eighth reference to the fourth variation of the second variable attribute.

5. The system of claim 1, wherein the first sub-object and the second sub-object each include a reference to the object.

6. The system of claim 1, further comprising:
  responding to the query by at least generating, based at least on the bucket, a user interface for displaying the object.

7. The system of claim 6, wherein the user interface displays the first sub-object and the second sub-object as a single line item.

8. The system of claim 6, wherein the user interface displays a first line item corresponding to the first sub-object and a second line item corresponding to the second sub-object.

9. The system of claim 1, wherein the object further includes one or more common attributes.

10. A computer-implemented method, comprising:
  receiving, from a client, an indication that an object is associated with a first variable attribute having a first variation and a second variation, the object being further associated with a multiplier and one or more common attributes, the multiplier comprising the first variation of the first variable attribute and the second variation of the first variable attribute;
  responding to the indication by at least creating, at a database, a bucket that includes the object, a first sub-object, and a second sub-object, the first sub-object having a first reference to the first variation of the first variable attribute, and the second sub-object having a second reference to the second variation of the first variable attribute, the bucket being created at the database instead of creating a first object having the first variation of the first variable attribute and a second object having the second variation of the second variable attribute; and
  in response to receiving, from the client, a query accessing the object, accessing the bucket stored in the database.

11. The method of claim 10, wherein the multiplier comprises an array and/or a matrix storing the first variation of the first variable attribute and the second variation of the first variable attribute, and wherein the first reference and the second reference comprise pointers to first variation of the first variable attribute and the second variation of the first variable attribute stored in the multiplier.

12. The method of claim 10, further comprising:
  receiving, from the client, another indication that the object is associated with a second variable attribute having a third variation and a fourth variation; and
  responding to the other indication by at least creating the bucket to include a sub-object for each combination of the first variable attribute and the second variable attribute.

13. The method of claim 12, wherein the bucket is created to include a third sub-object and a fourth sub-object, wherein the first sub-object includes the first reference to the first variation of the first variable attribute and a third reference to the third variation of the second variable attribute, wherein the second sub-object includes the second reference to the second variation of the first variable attribute and a fourth reference to the third variation of the second variable attribute, wherein the third sub-object includes a fifth reference to the first variation of the first variable attribute and a sixth reference to the fourth variation of the second variable attribute, and wherein the fourth sub-object includes a seventh reference to the second variation of the first variable attribute and an eighth reference to the fourth variation of the second variable attribute.

14. The method of claim 10, wherein the first sub-object and the second sub-object each include a reference to the object.

15. The method of claim 10, further comprising:
  responding to the query by at least generating, based at least on the bucket, a user interface for displaying the object.

16. The method of claim 15, wherein the user interface displays the first sub-object and the second sub-object as a single line item.

17. The method of claim 15, wherein the user interface displays a first line item corresponding to the first sub-object and a second line item corresponding to the second sub-object.

18. A non-transitory computer readable medium storing instructions, which when executed by at least one data processor, result in operations comprising:

receiving, from a client, an indication that an object is associated with a first variable attribute having a first variation and a second variation, the object being further associated with a multiplier and one or more common attributes, the multiplier comprising the first variation of the first variable attribute and the second variation of the first variable attribute;

responding to the indication by at least creating, at a database, a bucket that includes the object, a first sub-object, and a second sub-object, the first sub-object having a first reference to the first variation of the first variable attribute, and the second sub-object having a second reference to the second variation of the first variable attribute, the bucket being created at the database instead of creating a first object having the first variation of the first variable attribute and a second object having the second variation of the second variable attribute; and in response to receiving, from the client, a query accessing the object, accessing the bucket stored in the database.

\* \* \* \* \*